United States Patent [19]
Williams

[11] Patent Number: 6,112,247
[45] Date of Patent: *Aug. 29, 2000

[54] NETWORK CONTROLLER FOR PROCESSING STATUS QUERIES

[75] Inventor: Steven D. Williams, Portland, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/972,758

[22] Filed: Nov. 18, 1997

[51] Int. Cl.⁷ .................................................. G06F 15/16
[52] U.S. Cl. ................... 709/236; 709/224; 709/227; 709/250; 370/248; 713/323
[58] Field of Search .................................. 370/248, 445, 370/401, 410, 450; 385/182.02; 714/4; 713/324, 310, 323; 709/236, 224, 227, 250

[56] References Cited

U.S. PATENT DOCUMENTS

| | | | |
|---|---|---|---|
| 5,404,544 | 4/1995 | Crayford | 713/310 |
| 5,548,578 | 8/1996 | Matsune et al. | 370/248 |
| 5,699,350 | 12/1997 | Kraslavsky | 395/182.02 |
| 5,742,833 | 4/1998 | Dea et al. | 714/4 |

FOREIGN PATENT DOCUMENTS 135270  11/1995  Japan ........................................ 44/300

Primary Examiner—Dung C. Dinh
Assistant Examiner—Chuong Ho
Attorney, Agent, or Firm—Leo V. Novakoski

[57] ABSTRACT

A method is provided that allows a networked computer to generate a routable response to a status query without invoking its communication protocol stack. The computer is provided with a network controller that includes query detection and data routing modules. A message received by the network controller is scanned for a recognition code that identifies the message as a status query. A status query message includes a prototype response that includes the IP data necessary to respond to the query. When a message is identified as a status query, the data routing module extracts network routing data and the prototype response from the message and generates a routable response packet from the extracted information. Status data may be added to the routable response packet by the data routing module.

24 Claims, 8 Drawing Sheets

NETWORK CONTROLLER FOR PROCESSING STATUS QUERIES

BACKGROUND OF THE INVENTION

1. Technical Field

The present invention relates to computer systems, and in particular, to systems and methods for coupling messages among networked computers.

2. Background Art

As computer use proliferates and computers become more powerful, there is a growing interest in the use of power management systems to minimize the power consumed by idle computers. The Advanced Control And Power Interface ("ACPI") sponsored by Intel, Microsoft, and Toshiba is an example of one such power management protocol (ACPI V.1 available at www.teleport.com/~acpi). A computer implementing ACPI, for example, transitions to a lower power consumption state ("low power state") at the behest of the local operating system when selected "idle" conditions are detected. In a networked computer, ACPI transitions the CPU and support logic of an idle computer to a power state providing the minimum power consistent with the role of the computer in network operations. This low power state typically leaves the computer's network controller, which couples the computer to the network medium, in a standby state to monitor the network for interesting "events". These events include, for example, incoming phone calls or message packets. When the network controller detects these events, it triggers the computer to transition to a higher power state in which CPU-implemented communications programs ("communication stack") respond to the call or message packet.

Often, the only action required by the computer once it is in the higher power state is to respond to a relatively simple status request. In the following discussion, "status request" refers to a message that seeks relatively low level information about the state of the computer. This information includes static information about the computer itself or information that is tracked as a matter of course when the CPU is operating. A well-known example of a status request is the IP echo request or Ping. IP echo requests are typically generated by servers running network administration software to determine if one or more targeted computers are connected to the network and in a functional state. A node is in a functional state when it is powered-on, independent of the current power state of the node. A computer receiving an echo request responds by generating a relatively simple response when the request is detected. In general, status requests may be used to check for the presence of computers on a network, gather statistics on network operations, monitor traffic at various nodes, and inventory equipment. Many status requests are sent periodically by network administration software to monitor the network's condition.

Despite the relatively simple nature of the information sought by status requests, the complete communications infrastructure of the computer is used to process and respond to these messages in many cases. For example, where the requesting and responding computers are on different networks, the responding computer relies on its communication infrastructure to generate a routable response to the status request. In particular, the CPU and other functional elements of the system implement the communication protocol stack necessary to read each request message and generate an appropriate response. These routines provide the routing information necessary to return the requested information to the node that originated the status request.

When a computer in a low power state receives a status request, the computer's network controller triggers the computer to transition to a power state in which the CPU and its supporting logic have sufficient power to operate. The CPU executes the communication routines that process the request and generate an appropriate response, before returning to low power state. Periodic status requests thus cycle an idle computer repeatedly between low and high power states. This reduces the amount of time the idle computer spends in low the power state, and the transition process itself consumes additional power. Processing such status queries can thus reduce the power efficiency of the computer and undermine the conservation strategy of the computer's power management system.

One possible solution to this power consumption problem is to add a communication stack to the network controller to process status requests when the CPU and its support logic are in a low power state. However, this approach adds substantial circuitry to the network controller. It also requires a relatively complex synchronization scheme to coordinate the communication stack in the network controller with the communication stack implemented by the CPU. The latter stack is still necessary for processing more complex messages. For these and other reasons, it is generally deemed impractical to provide an additional communication stack in the network controller.

SUMMARY OF THE INVENTION

The present invention is a system and method for responding to selected status requests received by a networked computer. The computer includes a network controller that is modified to detect the selected status requests and generate a response without invoking the communication stack implemented by the computer's CPU.

In accordance with the present invention, a network controller receives a message and scans the received message for a specified bit pattern. The specified bit pattern identifies a message as a status query that includes a prototype response. If the bit pattern is identified, the network controller retrieves network header data and the prototype response from the status query and combines the retrieved information into a routable response message.

In one embodiment of the invention, the specified bit pattern is a well-known port assignment and a query is recognized by reading a destination port field in an IP header of the message.

BRIEF DESCRIPTION OF THE DRAWINGS

The present invention is illustrated by way of example in the following drawings in which like references indicate similar elements. These drawings disclose various embodiments of the invention for purposes of illustration only and are not intended to limit the scope of the invention.

DETAILED DESCRIPTION OF THE INVENTION

The following description sets forth numerous specific details to provide a thorough understanding of the invention. However, those of ordinary skill in the art having the benefit of this disclosure will appreciate that the invention may be practiced without these specific details. In other instances, well known methods, procedures, components, and circuits have not been described in detail in order to more clearly highlight the features of the present invention.

Figure 1A:
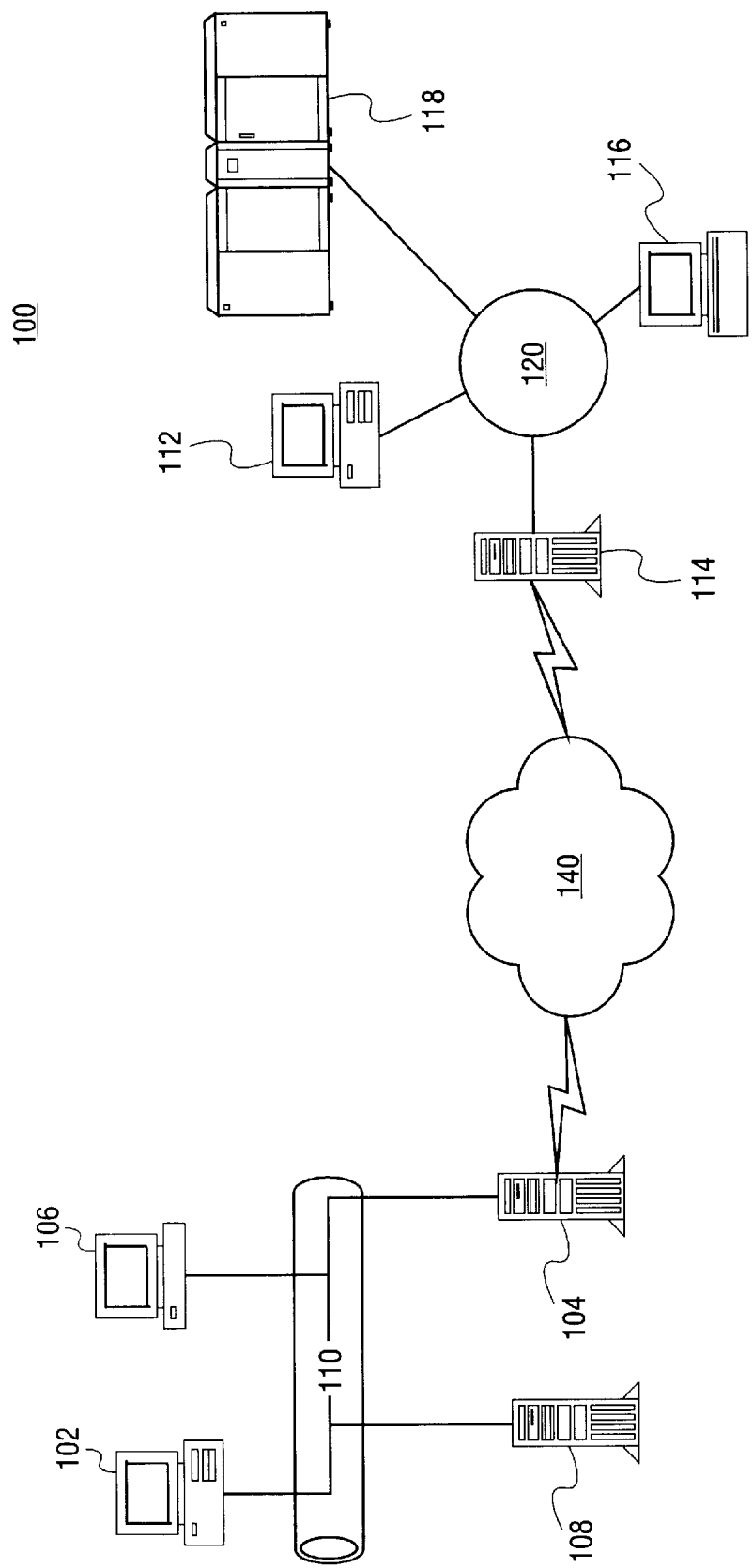
FIG. 1A is a schematic representation of a network in which the present invention may be practiced.

Referring first to FIG. 1A, there is shown a network 100 in which the present invention may be used. Network 100 includes a first subnetwork 110, a second subnetwork 120, and an intervening network 140 through which first and second subnetworks 110, 120 are coupled. Intervening network 140 may include, for example, one or more subnetworks, such as Wide Area Networks (WANs), Local Area Networks (LANs), as well as wired and wireless communication links.

It is noted that subnetworks 110, 120 are themselves networks. They are referred to as subnetworks in this discussion to indicate that they are also part of a larger network that also includes Internet 140.

Data transfers among nodes on first and second subnetworks 110, 120 and intervening network 140 adhere to a standard communications protocol. For example, where intervening network 140 corresponds to the Internet, the communications protocol is typically one of the protocols in the Internet protocols family. These include the Transport Control Protocol ("TCP"), Unreliable Datagram Protocol (UDP) and several others, many of which are used in conjunction with the Internet Protocol ("IP"), e.g. TCP/IP, UDP/IP, etc. Unless greater specificity is required, these protocols are referred to as IPs in the discussion that follows.

For purposes of illustration, first subnetwork 1 10 is shown as an ethernet network that includes a personal computer (PC) 102, a workstation 106, a server 108, and a router 104. Similarly, second subnetwork 120 is shown as a token ring network that includes a personal computer 112, a workstation 116, a mainframe computer 118, and a router 114. Routers 104 and 114 couple subnetworks 110 and 120, respectively, to the Internet (intervening network 140 ). In general, computing devices such as personal computers 102, 104 workstations 106, 116, server 108, mainframe 118, and routers 104, 114 are often referred to as the nodes of network 100. The present invention does not depend on the type or number of computing devices on subnetworks 110, 120.

The principal benefits of the present invention are realized where messages are routed through two or more networks, e.g. between nodes on (sub)networks 110 and 120. However, it is also suitable for handling communications between nodes on the same subnetwork, e.g. PC 102 and server 108 on subnetwork 110.

One of the principle motivations for forming computer networks is to allow the computing devices that form the different nodes to communicate with each other. This is typically accomplished through the exchange of message packets or datagrams. These message packets can traverse heterogeneous network environments like network 100 by adhering to a standard communication protocol. The IPs indicated above are typical of those used for Internet-based communications, but the present invention can operate with any of the known communication protocols.

Figure 1B:
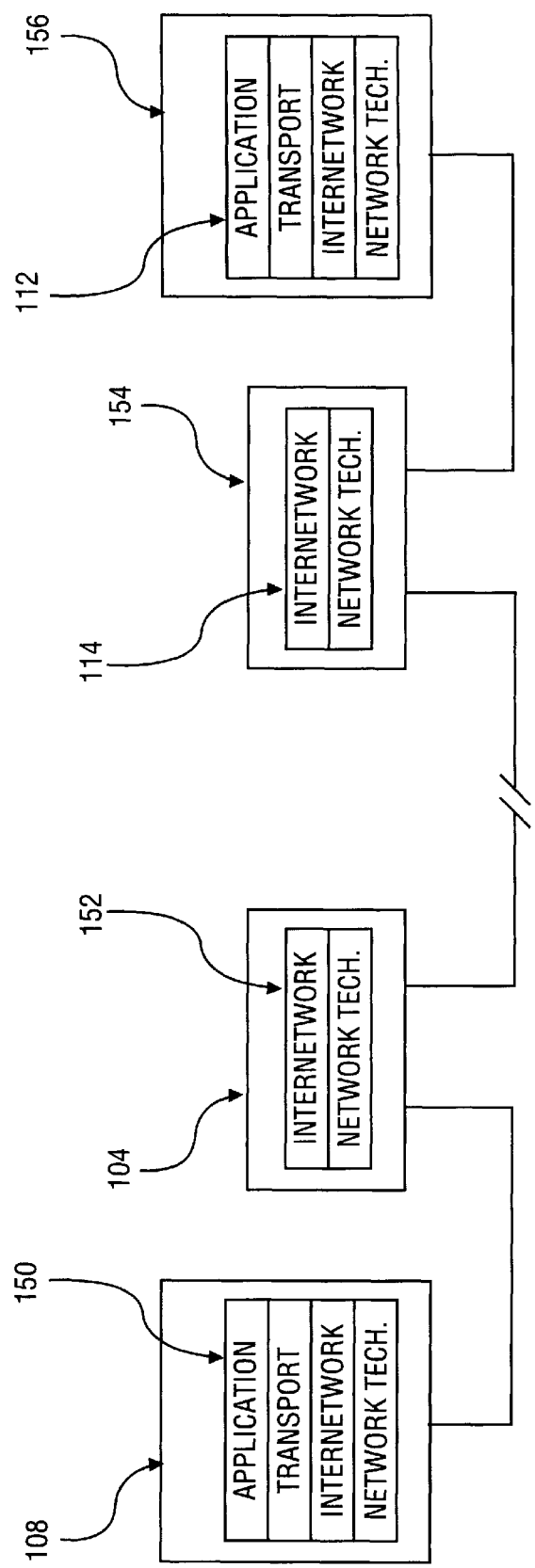
FIG. 1B is a schematic representation of the communication protocol used to couple messages among the nodes of the network of FIG. 1A.

Referring now to FIG. 1B, there are shown communication protocol stacks 152, 154, 156, 158 (collectively, "communication protocol stacks 150") which represent the message processing and generating resources required to transfer message packets among the nodes on subnetworks 110 and 120. In particular, communication stacks 152, 154, 156, and 158 represent the layered architecture into which the software and hardware resources of computing devices 108, 104, 114, 112, respectively, are organized to process network communications. These resources typically include the CPU, support logic for the CPU, communication routines implemented by the CPU, and a network controller that couples the computing device to its subnetwork. The layered architecture shown in FIG. 1B is that of the TCP/IP protocols, which is described, for example, in Stephen Thomas, *IPng and the TCP/IP Protocols*, John Wiley & Sons, New York (1996).

Referring still to FIG. 1B, communication protocol stacks 152, 158 each comprise application, transport, internetwork, and network technology layers. The application layer represents the applications running on a computing device that send data to and receive data from other computing devices on the network. These applications include file transfer applications, remote terminal emulation applications, and mail applications. The transport layer includes modules that package data from the application layer for reliable delivery and distribute data received from other network nodes to the appropriate applications. This layer corresponds approximately to the TCP or UDP portions of the example protocol.

The internetwork layer includes modules that format the packaged data from the transport layer into "datagrams" for transfer across the network, e.g. network 100, and forward packaged data extracted from received datagrams to the transport layer. In particular, the internetwork layer generates an IP header for each datagram. The IP header includes IP addresses that uniquely identify the original source node and ultimate destination node(s) of the datagram among all the nodes of network 100. Here, the original source node refers to the computing device that originates the datagram and the ultimate destination node refers to the computing device(s) that processes the datagram. The datagram often passes through other nodes between the original source and ultimate destination nodes, but these other nodes merely forward the datagram. As discussed below, formatting the datagram for transmission between any two nodes in the transmission path is largely the province of the network technology layer. The internetwork layer corresponds approximately to the IP portion of, for example, the TCP/IP and UDP/IP protocols.

The network technology layer packages the datagram in a format that is suitable for transfer across the subnetwork to which the node is coupled through its network controller. The formatted datagram is often referred to as a frame. When a frame is transmitted between networks, it includes a header ("NT header") prepended to the datagram, and a trailer ("NT trailer") appended to the datagram. The NT header and trailer are specific to the type of subnetwork being traversed. The NT header includes the local address of the node on the subnetwork that generates the frame (local source node) and the local address of the frame's destination on the subnetwork. Unlike IP addresses, local addresses are guaranteed to be unique only within a particular subnetwork and change when the datagram is coupled to a different subnetwork.

Local/ultimate source and destination nodes may be illustrated by reference to FIG. 1A. For a datagram that traverses intervening network 140 between server 108 (the original source node) on subnetwork 110 and PC 112 (the ultimate destination node) on subnetwork 120, server 108 is the local source node in the frame that traverses subnetwork 110 and PC 112 is the local destination node in the frame that traverses subnetwork 120. The local destination node in the frame on subnetwork 110 is router 104, which couples subnetwork 110 to intervening network 140. Router 104 typically modifies the NT header and trailer of the received frame according to the type of technology employed by network 140. The local source node in the frame on subnetwork 120 is router 114, which receives the datagram from the Internet and modifies the associated NT header and trailer according to the type of technology employed in subnetwork 120. The datagram remains constant across the different subnetworks with server 108 and PC 112 indicated as the original source and ultimate destination nodes, respectively, in the IP header. Since routers 104, 114 typically only forward message packets received from other nodes of network 100, stacks 152, 154 only include internetwork and network technology layers.

Figure 2:
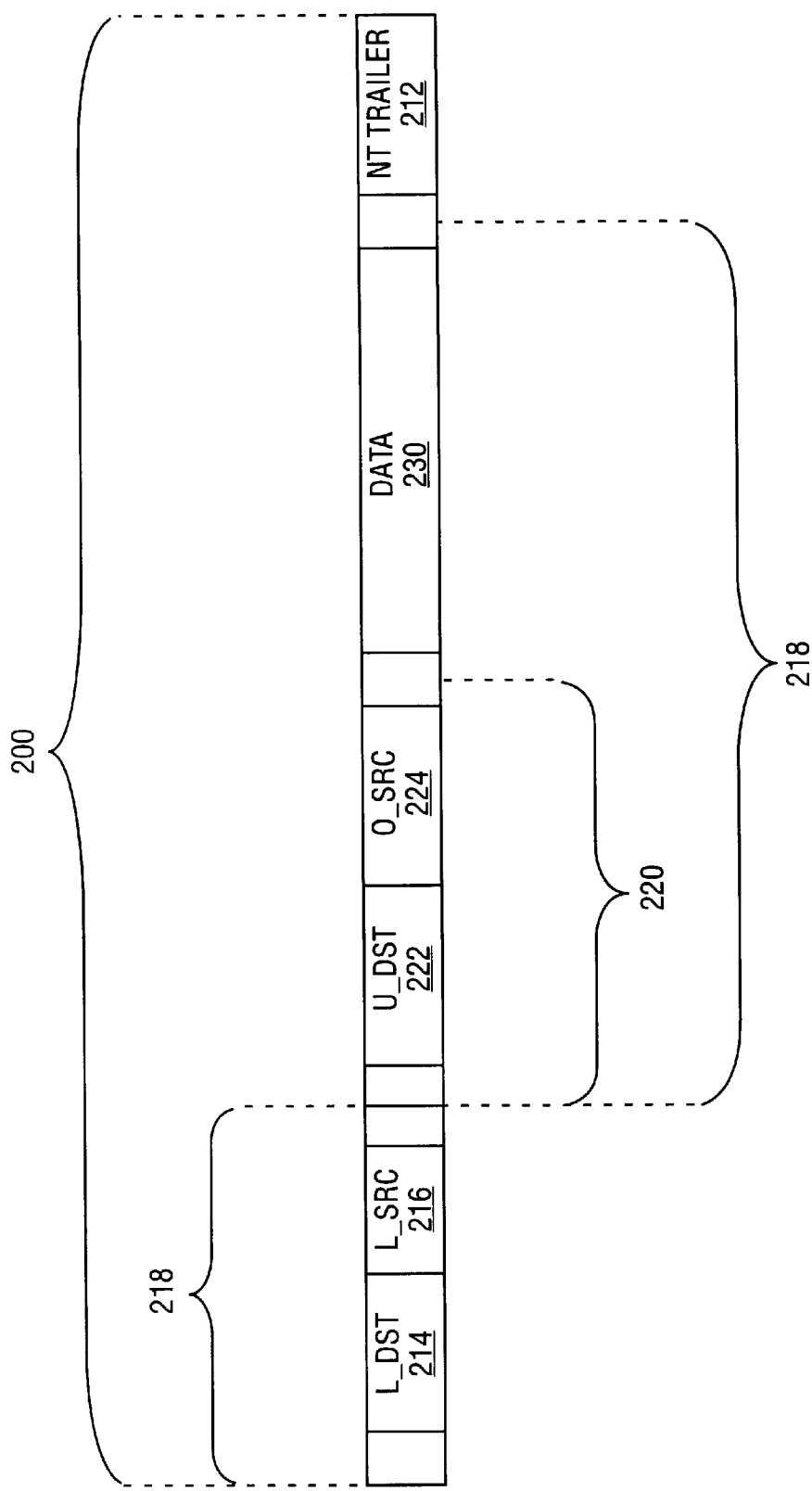
FIG. 2 is a block diagram of a conventional message for transmitting a datagram between the nodes of a computer network.

Referring now to FIG. 2, there is shown a block diagram of a frame 200 for transmission across one of the subnetworks of network 100. An NT trailer 212 indicates the end of message packet 200 and typically includes a check sum for testing the reliability of transmission. An NT header 210 specifies a local destination ($L_{13}$ DST) 214 and source (L_SRC) 216 for frame 200 on the current subnetwork. As frame 200 is routed between its original source and ultimate destination nodes through various subnetworks, the forms of NT header and trailer 210, 212 are modified by the communications stacks of the routers and switches that couple the subnetworks. In particular, NT header 210 and trailer 212 are modified to reflect the network technology, e.g. ethernet, token ring, FDDI, as well as the local destination 214 and local source 216 on the current subnetwork. Local source 216 points to the original source node when frame 200 traverses the subnetwork to which the original source node is coupled. Similarly, local destination 216 points to the ultimate destination node when frame 200 traverses the subnetwork to which the ultimate destination node is coupled.

Following NT header 210 is a datagram 218 comprising an IP header 220 and a data field 230. IP header 220 specifies an ultimate destination (U_DST) 222 and an original source (O_SRC) 224 for datagram 218. In particular, O_SRC 224 specifies the internet address (IP) address of original source node, e.g. server 108 in the example above, while U_DST 222 specifies the IP address of the node for which the datagram is ultimately intended. IP header 220 typically includes additional fields that specify, for example, the message priority and version of the IP protocol employed by the source node. IP header 220 is generated by the internetwork layer and prepended to data field 230, which includes data generated by the application layer and formatted by the transport layer.

In conventional computing devices, e.g. server 108 and PCs 102, 112, the modules of the application, transport, internetwork, and network technology layers are typically implemented as software routines on the CPU of the computing device. Consequently, computing devices generally require their CPUs and supporting logic to process frame 200, retrieve datagram 218, and generate a responsive datagram with the appropriate NT header 210 and trailer 212. For these reasons, receipt of frame 200 by a computing device in a low power state, e.g. PC 112, requires that the CPU and its supporting logic transition from the low power state to the full power state to execute the appropriate software routines.

The present invention allows a computing device to communicate with other computing devices coupled to it through a network, without interfering with power management systems that may be operating on these other computer devices. In particular, the present invention allows a first computer to elicit status, inventory, and other types of information from a second computer that is in low power consumption state without causing the core of the second computer (its CPU and support logic) to transition to a higher power consumption state.

In one embodiment of the invention, the second computer is coupled to the network through a network controller that includes a shunt circuit. The shunt circuit includes a query recognition module to recognize request messages (hereafter, "status query") that can be handled without invoking the CPU and supporting logic of the second computer. The shunt circuit also includes a data routing module to extract NT header data and prototype response data from the status query, and generate a fully routable response to the status request from the retrieved data. Adopting a standardized form for these queries simplifies the recognition and routing modules needed to generate responses.

Figure 3:
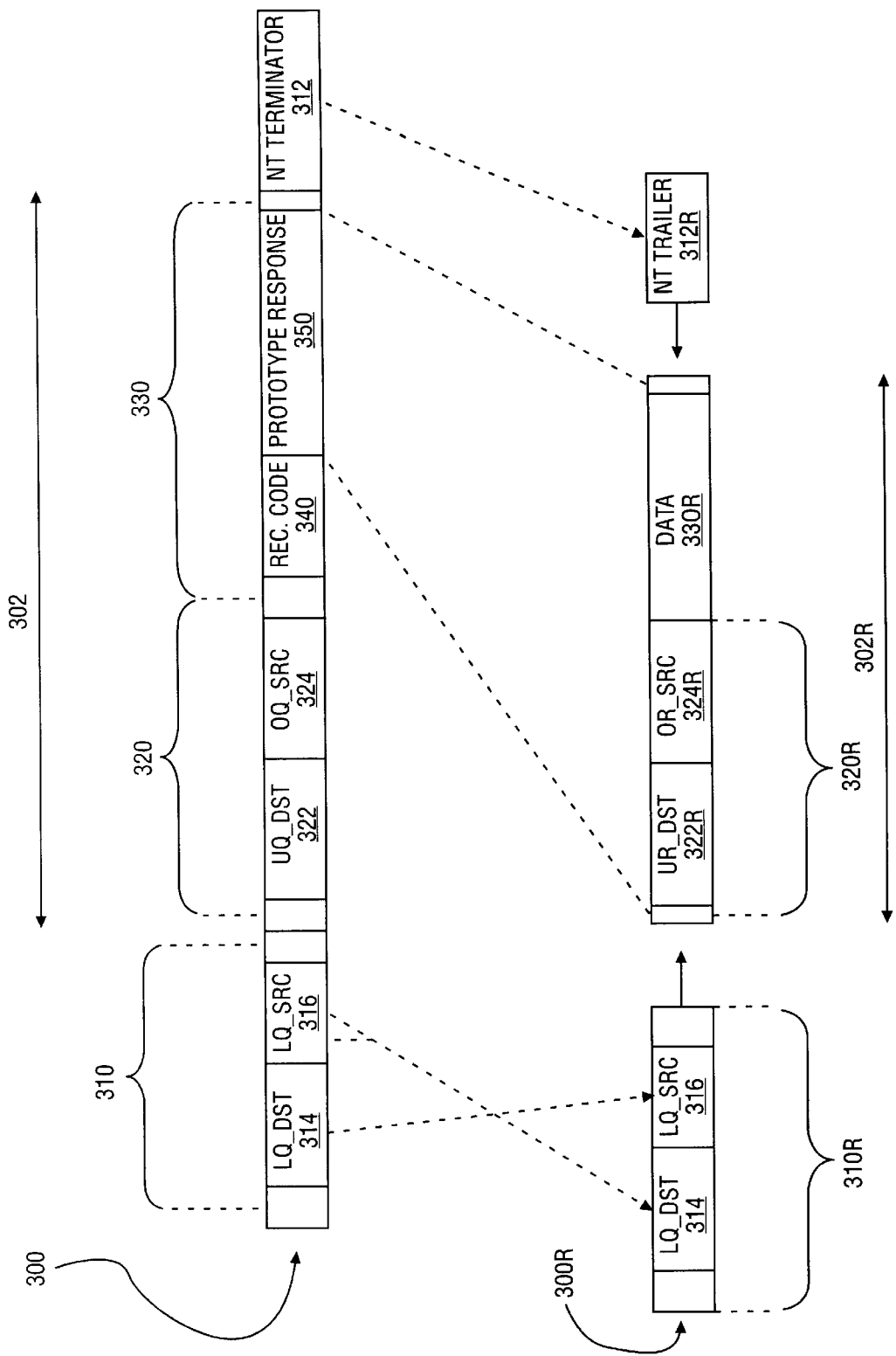
FIG. 3 is a block diagram of a modified status query message for processing by a network controller in accordance with the present invention.

Referring now to FIG. 3, there is shown a block diagram of a frame 300, including a status query 302 for use with the present invention. As in FIG. 2, frame 300 begins with an NT header 310 that specifies local destination and source nodes LQ_DST 314 and LQ_SRC 316, respectively, and concludes with an NT trailer 312. Status query 302, the datagram portion of frame 300, includes an IP header 320 that specifies its ultimate destination and original source nodes, UR_DST 322 and OR_SRC 324.

Two additional features of status query 302 are a recognition code 340 and a prototype response 350. In the disclosed embodiment, recognition code 340 is a specified bit sequence that identifies a message as a status query 302. In one embodiment of the invention, circuitry in a network controller (FIGS. 4–6) scans an incoming message and determines whether it includes recognition code 340, i.e. whether the message is a status query. When a status query 302 is recognized, circuitry in the network controller retrieves selected data from the frame, and generates a responsive message from the retrieved data, without recourse to the CPU or supporting logic of the destination node.

Prototype response 350 is used to form the IP portion of the response to status query 302. Prototype response 350R includes an IP header 320R that specifies its ultimate destination and original source nodes UR_DST 322R and OR_SRC 324R, respectively, and, optionally includes an IP data field 330R. Since prototype response 350 is provided by status query 300, UR_DST 322R specifies the IP address of the source node that originated status query 300, i.e. OQ_SRC 324. Similarly, OR_SRC 324R specifies the IP address of the destination node designated in UQ_DST 322, i.e. the current node. In unicast, (node to node) status queries, the original source and ultimate destination nodes of the response may thus be specified in prototype response 350 when the query is generated. This eliminates the need to invoke the communication stack of the responding node to generate the datagram portion of the response.

The present invention also supports status requests issued as multi-cast or any-cast messages, in which multiple destination nodes are targeted by the source node. As above, the ultimate destination node for the response is the original source node of the query, and may be specified in the prototype response when the query is generated. Each node receiving the request provides its IP and local addresses to the IP source and local source fields, respectively, of response frame 300R using the circuitry of the network controller.

In addition to UR_DST 322R and OR_SRC 324R, prototype response 350 may also include a data field or place holder 330R to which data routing circuitry in the network controller adds selected data from one or more registers accessible to the network controller. In particular, a register may include status, inventory, or access data required by the source node to administer, monitor, or maintain selected nodes in network 100. Similar registers may be used to store IP address and local address information for the node for use in responding to multi-cast and any-cast messages.

Figure 4:
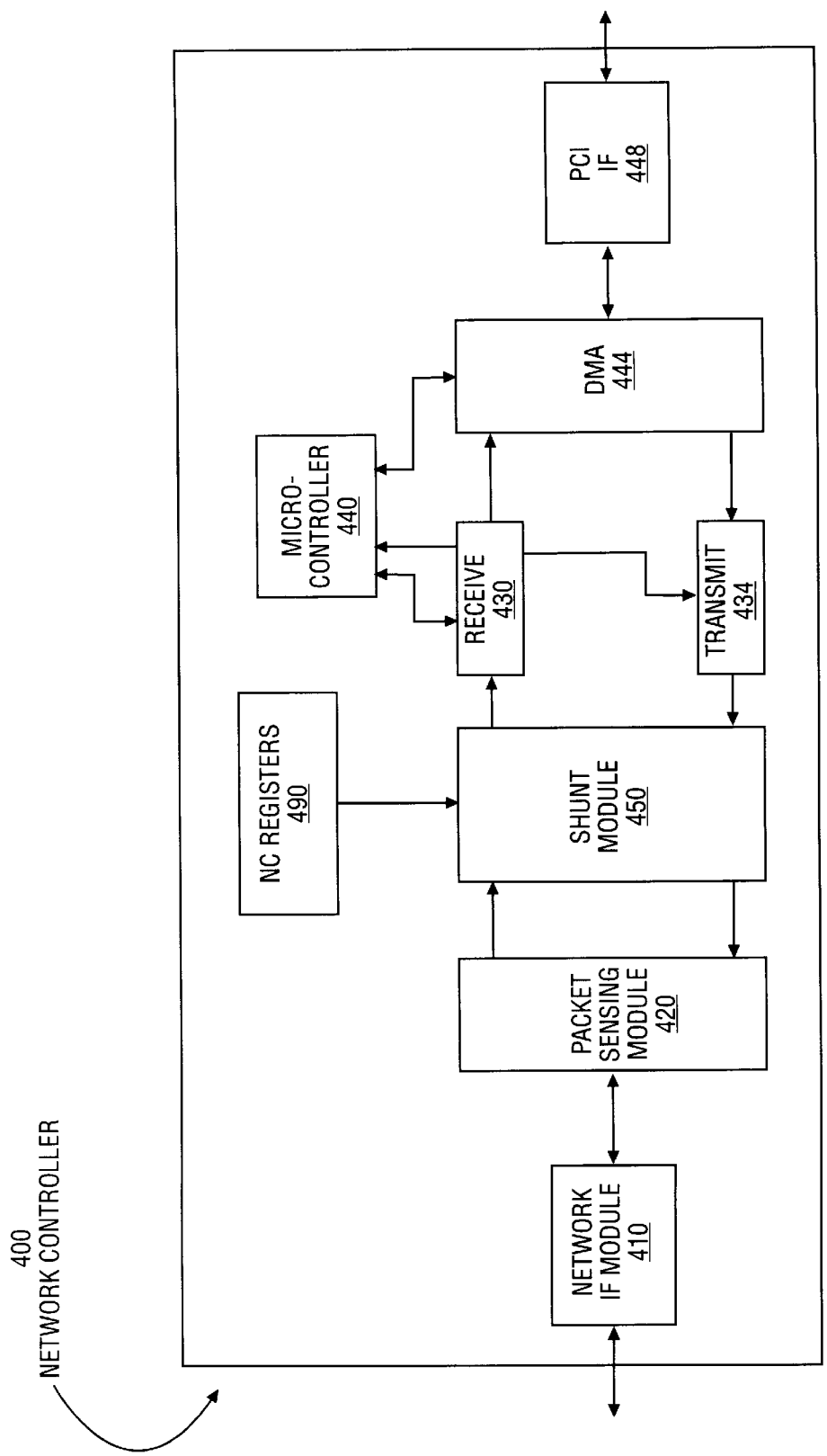
FIG. 4 is a block diagram of an embodiment of a network controller, including query recognition and data routing modules, in accordance with the present invention.

Referring now to FIG. 4, there is shown an embodiment of a network controller 400 for coupling a computing device to a network in accordance with the present invention. A network interface module 410, a packet sensing module 420, and receive and transmit buffers 430, 434, respectively, form a front end that couples network controller 400 to the physical network. A DMA module 444 and a peripherals component interconnect interface (PCI IF) module 448 form a back end that couples network controller 400 to the rest of the computing device. A micro-controller 440 controls data flow between the front and back ends of network controller 400. Also shown is an optional register 490 for storing selected status, inventory, and related data. In the disclosed embodiment, a shunt circuit 450 for identifying and responding to query packets is coupled to the front end logic of network controller 400.

Network interface module 410 provides the electrical and mechanical coupling between packet sensing module 420 and the network hardware to which network controller 400 is coupled. Packet sensing module 420 includes logic for monitoring packet traffic on the underlying network to determine when the network is available for sending message packets. For ethernet network technology, packet sensing module 420 typically implements a Carrier Sense Multiple Access/Collision Detection (CSMA/CD) protocol. For token ring network technology, packet sensing module 420 determines when network controller 400 receives the token required to transmit message on the network.

Buffers 430 and 434 provide temporary storage for incoming and outgoing messages, respectively. Micro-controller 440 controls the flow of data between buffers 430, 434 and the rest of the computing device, through DMA module 444 and PCI IF 448.

In the disclosed embodiment of network controller 400, shunt module 450 is coupled to packet sensing module 420 to monitor incoming message packets and respond to status queries when they are detected. Configuring shunt circuit 450 in the front end of network controller 400 limits the amount of logic that needs to be powered to respond to a status query. Various other configurations, discussed below, may provide comparable power savings.

Shunt module 450 includes circuitry for retrieving data from NT header 310 and prototype response 350 when a status query 302 is identified and forming a response frame 300R (FIG. 3) from the retrieved data. In addition, shunt module 450 may include circuitry for incorporating into response packet 300R status, inventory, and similar data available in register(s) 490.

Referring again to FIG. 3, frame 300 includes data in a specific order. This facilitates scanning a message for recognition code 340 and, where appropriate, generating a response using data retrieved from the message. For example, the bit stream representing frame 300 includes the local destination (LQ_DST 314), the local source (LQ_ 316), IP header 320, and prototype response 350 in order. Since the length and order of these data fields are specified for each protocol, the circuitry necessary to retrieve and reorder the desired data need not be very complex.

Figure 5:
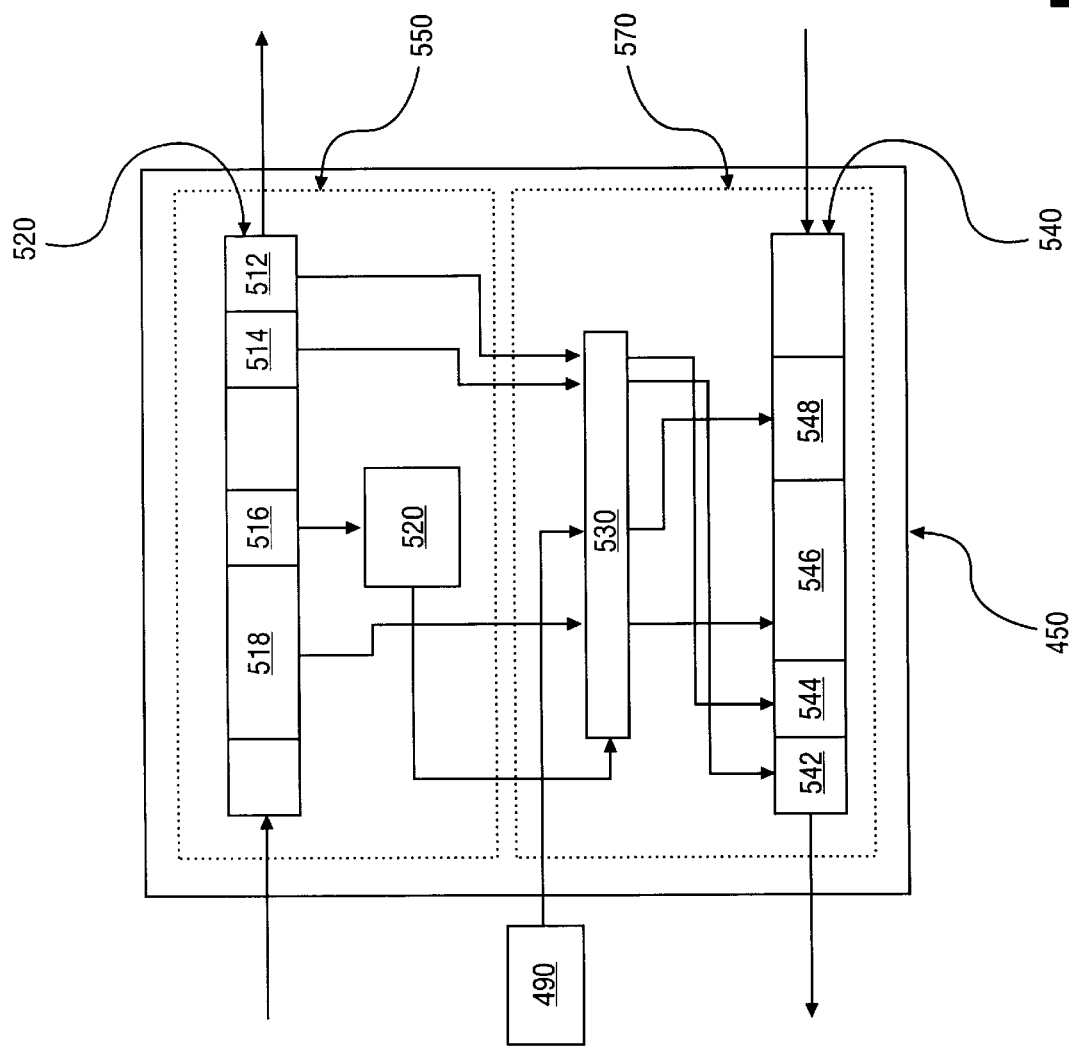
FIG. 5 is a block diagram of one embodiment of the shunt circuit of FIG. 4.

Referring now to FIG. 5, there is shown one embodiment of shunt circuit 550 comprising a query detection module 550 and a data routing module 570. Query detection module 550 includes an inbound buffer 510 and a comparison circuit 520. Inbound buffer 510 is coupled to receive message packets from packet sensing module 420 and to couple data from received message packets to the back end of Network Controller 400 or to a data routing circuit 530 according to the type of message received. In particular, comparison circuit 520 is coupled to read selected slots of inbound buffer 510 for recognition code 340. If the indicated recognition code 340 is present, comparison circuit 520 triggers data routing module 530 to couple data out of inbound buffer 510. In one embodiment of shunt circuit 450, data is coupled out of inbound buffer 510 in parallel. If recognition code 340 is not detected in the selected slots of inbound buffer 510, the message packet is forwarded to the back end of Network Controller 400.

Data routing module 570 includes routing circuit 530 and outbound buffer 540. Routing circuit 530 is coupled to receive data from inbound buffer 510 and transfer it to selected slots of outbound buffer 540 when triggered by comparison circuit 520. Routing circuit 530 may optionally receive data from register 490 and transfer it to selected slots of outbound buffer 540 when indicated to do so by a detected status query. For example, node status or activity data may be provided to a data field (548) of outbound buffer 540. IP address information may be provided to an IP header field (544) in response to receipt of a status request delivered as a multi-cast or any-cast message.

In the disclosed embodiment of shunt circuit 450, the slots of inbound buffer 510 are divided into fields 512, 514, 516, and 518 which correspond to LQ_DST 314, LQ_SRC 316, recognition code 340, and prototype response 350, respectively, of query frame 300. Data present in fields 512, 514, and 518 when a status query is received is coupled to fields 544, 542, and 546, respectively, of outbound buffer 540 through routing circuit 530. Routing circuit 530 is triggered to latch the data from inbound buffer 510 to outbound buffer 540 by comparison circuit 520, when recognition code 340 is detected in field 516.

For those status queries 300 that request data from register 490, the requested data is provided to field 548 through routing circuit 530, when the latter is triggered by comparison circuit 520. Different entries in register 490 may be coupled to field 548 of outbound buffer 540 depending on the value of recognition code 340. To facilitate recognition of status queries 300, recognition code 340 is assigned to a readily located field in status query 300. In one embodiment, recognition code 340 is a well-known port designated in a destination port field (not shown) of IP header 320. In an alternative embodiment, recognition code 340 may be assigned to a bit field in the data segment of query 300 that precedes response prototype 350. NT trailer 312 is typically provided by packet sensing receive 420, although other implementations are possible.

In one embodiment of shunt circuit 450, inbound buffer 510 and outbound buffer 540 are receive and transmit buffers 430, 434 of Network Controller 400. In this embodiment, receive buffer 430 accommodates both serial and parallel output, while transmit buffer 434 accommodates both serial and parallel input. This embodiment has the advantage of limiting the number of buffers necessary to implement Network Controller 400. In another embodiment of the invention, the functions of comparison module 520 and routing module 530 are implemented as software module by microcontroller 440. In still another embodiment of the invention, these functions may be implemented using various combinations of circuitry, software, and firmware.

Figure 6:
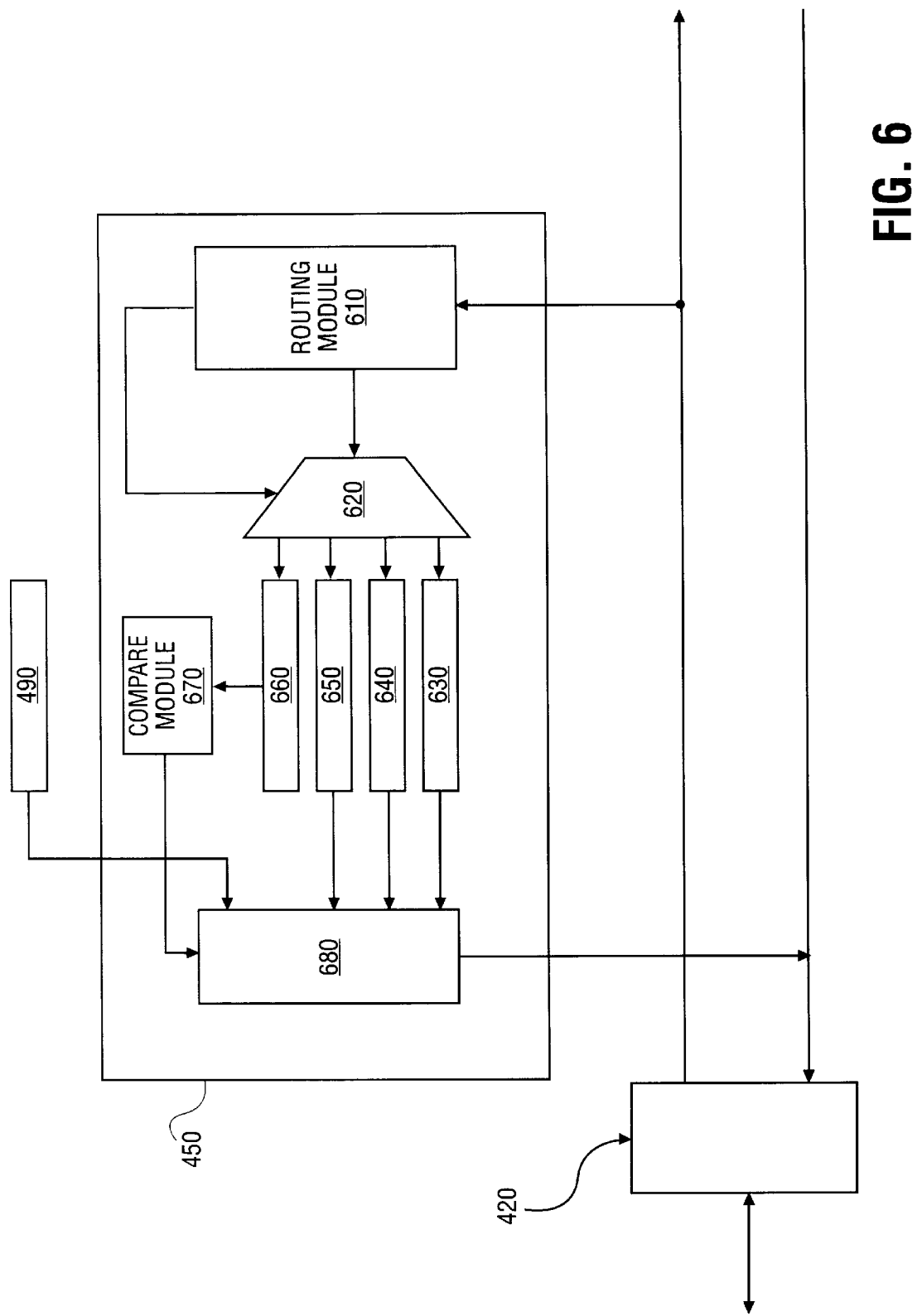
FIG. 6 is a block diagram of another embodiment of the shunt circuit of FIG. 4.

Referring now to FIG. 6, there is shown an alternative embodiment of shunt circuit 450 that analyzes the bit stream corresponding to a message packet on-the-fly. In this case, the bit stream is driven to both module buffer 430 and shunt circuit 450. Shunt circuit 450 includes a routing module 610 that identifies data fields in a message packet and routes the associated data to registers 630, 640, 650, 660 through MUX 620. Since NT and IP header fields have specified bit sizes, routing module 610 may locate the different data fields by counting the bits from the start of the message packet. As routing module 610 reaches the bits for a given field, MUX 620 is triggered to provide the bits to an appropriate one of registers 630, 640, 650, 660. For example, bit locations that correspond to NT_SRC, NT_DST, prototype response 350, and recognition code 340 of a message may be routed to registers 630, 640, 650, and 660, respectively.

Compare module 670 can determine whether the message is a status query by comparing the bits in register 660 with one or more acceptable recognition codes 340. If a status query is identified, compare module 670 triggers state machine 680 to form a packet having a suitable NT header from the data in registers 630, 640 and 650. Data from NIC register 490 may be added to the response packet if indicated by recognition code, and the response packet launched by state machine 680.

In the disclosed embodiment, data from a message packet will be present in buffer 430 and shunt circuit 450. Accordingly, if the message is identified as a status query, shunt circuit 450 indicates to controller 400 that it will process the response. This prevents the data in buffer 430 from being further processed by network controller 400 and avoids transitioning the node's CPU to a higher power state.

The embodiments of recognition module 550 and data routing module 570 disclosed in FIG. 6 are shown as dedicated circuits. However, some or all of these modules may be implemented as software modules by, for example, a microcontroller or embedded processor.

Figure 7:
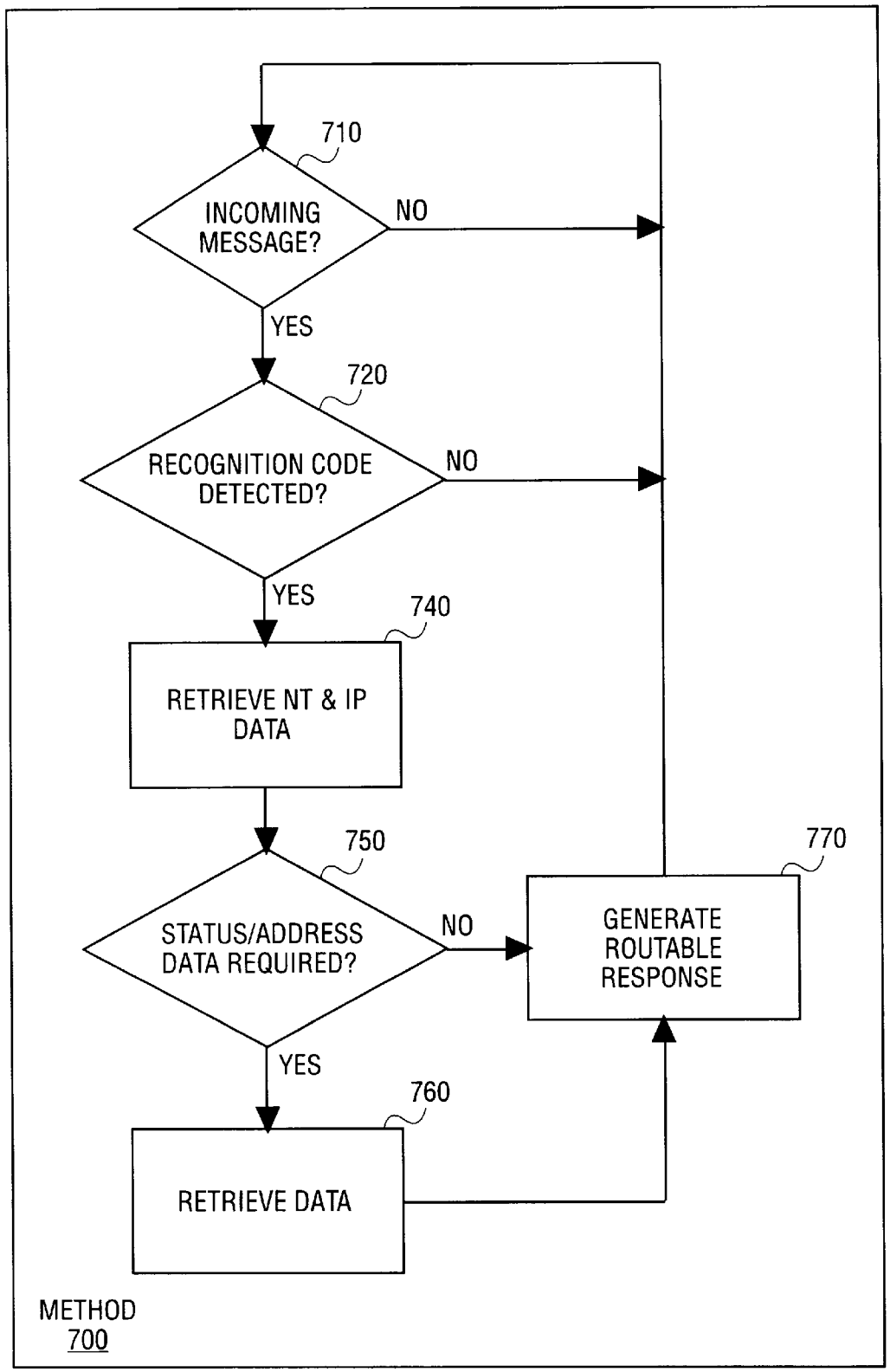
FIG. 7 is a flowchart of a method for processing the status query of FIG. 3 in accordance with the present invention.

Referring now to FIG. 7, there is shown a flow chart of a method 700 in accordance with the present invention for responding to status queries without invoking the CPU or its support logic. When a message is received 710, it is scanned 720 for a recognition code. In one embodiment of the invention, the recognition code may be one of a plurality of recognition codes, each of which requires a different type of status data from the receiving node. If none of the recognition codes are identified 720 in the message, the message is not a status query, and method 700 awaits 710 the next message. In this case, the message will be processed using other resources associated with the network controller, e.g. the associated CPU.

If a recognition code is identified 720 in the message, NT data, e.g. L_SRC and L_DST, and IP data, e.g. prototype response data, are retrieved 730 from the message. If the identified recognition code indicates 750 that additional status data or IP address data is required from the node, the data is retrieved 760 from an appropriate buffer and a routable response is generated 770 using the retrieved NT, IP, and status data. If the recognition code indicates 750 that no status or address data is required, the response is generated using the retrieved NT and IP data.

There has thus been provided a network controller capable of responding to selected status queries without resorting to the CPU and its support logic. For this purpose, the network controller includes a query recognition module and a data routing module. The query recognition module recognizes specified bit sequences in the bit streams associated with incoming messages to identify status queries. The data routing module retrieves NT and IP data from messages identified as status queries and generates a response from the retrieved data. The retrieved IP data includes a prototype message, which provides the IP header data for the response. It may also include node specific data made available through a buffer in the network controller. The data routing module uses the retrieved NT data to generate an NT header for the response that routes the retrieved data back to the originating node.

What is claimed is:

1. In a network controller capable of operating in lower power and higher power states, a method for responding to a status query comprising:

scanning an address portion of a message while in the lower power state to determine if the message is addressed to the network controller;

scanning a data portion of the message for a specified bit sequence if the message is addressed to the network controller;

if the specified bit sequence is detected, remaining in the lower power state and responding to the message, using a prototype response and network header data from the message; and if the specified bit sequence is not detected, signaling a transition to the higher power state to prepare a response.

2. The method of claim 1, wherein responding comprises:

generating a network header for a response message from the retrieved network header data;

appending the prototype response to the generated network header; and appending a network trailer to the prototype response.

3. The method of claim 2, wherein generating comprises:

designating as a local destination for the network header a local source specified in the retrieved network header data; and designating as a local source for the network header a local destination specified in the retrieved network header data.

4. The method of claim 2, further comprising:

determining whether additional data is required for the response message;

retrieving the required response data from a designated buffer; and adding the retrieved response data to the response message.

5. The method of claim 1, wherein responding to the message comprises generating a response comprises generating a response that may be routed to a node on a different network.

6. The method of claim 1, wherein remaining in the lower power state comprises maintaining a computer system associated with the network controller in a lower power state.

7. The method of claim 6, wherein maintaining the associated computer system in the lower power state comprises generating the response without activating a communication protocol stack implemented by the computer system.

8. A network controller for processing a status query without recourse to a communication protocol stack, the network controller comprising:

a network interface module to scan an address portion of a received message to determine if the message is addressed to the network controller;

a query recognition module coupled to the network interface module, the query recognition module being capable of operating in a lower power state to scan a data portion of the message for a specified bit sequence if the message is addressed to the network controller; and a data routing module that also operates in the lower power state to retrieve local source and destination data and prototype response data from the message and generate a routable response message from the retrieved source, destination, and response data when the specified bit sequence is detected in the data portion of the message.

9. The network controller of claim 8, further comprising a status data register to provide the data routing module with status data for the response message.

10. The network controller of claim 8, wherein the query recognition module comprises:

an inbound buffer including one or more storage locations; and a comparison module to compare data in the selected storage location with a specified recognition code and providing a match indication when the data matches the recognition code.

11. The network controller of claim 10, wherein the data routing module comprises:

an outbound buffer including one or more storage locations; and a selection module to couple data from a selected storage location in the inbound buffer to a storage location in the outbound buffer when the match indication is detected.

12. The network controller of claim 8, wherein the query recognition module and the data routing module are implemented by a programmable microcontroller.

13. The network controller of claim 8, wherein the query recognition module and the data routing module are implemented as dedicated circuits.

14. The network controller of claim 8, wherein the query recognition module invokes the communication protocol stack when the specified bit sequence is not identified in the received message.

15. A computer system comprising:

a processor;

a communication protocol stack, the communication protocol stack to be implemented by the processor to handle network communications when the computer system is in a higher power state; and a network controller including a query recognition module and a data routing module capable of operating in a lower power state, the query recognition module to determine from an address header whether an incoming message is addressed to the system and to determine from a data portion whether a message that is addressed to the system is a status query and the data routing module to generate a response to the incoming message if it is a status query, the network controller remaining in the low power state when the incoming message is a status query.

16. The computer system of claim 15, wherein the network controller further comprises a backend module, the back end module to operate in conjunction with the communication protocol stack to process an incoming message, when the incoming message is not a status query.

17. The computer system of claim 15, wherein the processor and network controller module transition from the lower power state to a higher power state to respond to an incoming message that is not a status query.

18. The computer system of claim 17, wherein the network controller further includes a backend module that operates in conjunction with the communication protocol stack when the network controller transitions to the higher power state.

19. The computer system of claim 15, wherein the query recognition module and the data routing module are implemented by a microcontroller.

20. A method for handling network communications in a computer system that includes a central processor and a network controller, the method comprising:

scanning an address header of a message received by the network controller to determine whether the received message is addressed to the network controller, when the computer system is in a lower power state;

if the message is addressed to the network controller, determining whether the message is a status query;

the network controller remaining in the lower power state and generating a response to the message if the message is a status query; and the network controller invoking a communication protocol implemented by the central processor to generate a response if the message is not a status query.

21. The method of claim 20, wherein invoking a communication protocol triggers the central processor to transition from the lower power state to a higher power state.

22. The method of claim 20, wherein the network controller generating a response comprises:

the network controller retrieving a prototype response and address information from the status query; and the network controller combining the retrieved prototype response and address information to form a status query response.

23. The method of claim 22, further comprising the network controller providing status information from a register to the status query response.

24. The method of claim 20, wherein determining whether the detected message is a status query comprises;

comparing data in a field of the detected message with a selected bit sequence; and identifying the detected message as a status query when the data matches the selected bit sequence.

* * * * *